(12) United States Patent
Kp et al.

(10) Patent No.: US 9,530,386 B2
(45) Date of Patent: Dec. 27, 2016

(54) METHODS AND APPARATUS TO PROVIDE EXTENDED GRAPHICS PROCESSING CAPABILITIES

(71) Applicant: Intel Corporation, Santa Clara, CA (US)

(72) Inventors: Sameer Kp, Bangalore (IN); Selvakumar Panneer, Hillsboro, OR (US); Susanta Bhattacharjee, Bangalore (IN); Mrinalini Attaluri, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 14/227,908

(22) Filed: Mar. 27, 2014

(65) Prior Publication Data

US 2015/0279338 A1 Oct. 1, 2015

(51) Int. Cl.
*G06F 13/14* (2006.01)
*G06T 1/00* (2006.01)
(Continued)

(52) U.S. Cl.
CPC . *G09G 5/39* (2013.01); *G06T 1/20* (2013.01); *G09G 2360/12* (2013.01); *G09G 2360/18* (2013.01)

(58) Field of Classification Search
None
See application file for complete search history.

(56) References Cited

U.S. PATENT DOCUMENTS 5,269,021 A * 12/1993 Denio ............... G06F 9/44521
345/502
5,745,761 A * 4/1998 Celi, Jr. ................. G06F 3/14
345/522

(Continued)

FOREIGN PATENT DOCUMENTS

WO 2012146927 11/2012

OTHER PUBLICATIONS

"A Trip Through The Graphics Pipeline 2011, Part 1," Jul. 1, 2011(11 Pages) [Retrieved via internet at http://fgiesen.wordpress.com/2011/07/09/a-trip-through-the-graphics-pipeline-2011-index/].

(Continued)

*Primary Examiner* — Jacinta M Crawford
(74) *Attorney, Agent, or Firm* — Hanley, Flight & Zimmerman, LLC

(57) ABSTRACT

Methods, apparatus, and articles of manufacture to provide extended graphics processing capabilities are disclosed. A disclosed example method involves sending a display panel parameter to a shared library module. The display panel parameter is sent by a programmable driver interface in communication between the shared library module and a graphics hardware device driver. The shared library module includes a first graphics processing capability. The graphics hardware device driver includes a second graphics processing capability different from the first graphics processing capability. The example method also involves performing a render operation via the programmable driver interface on a frame buffer based on the first graphics processing capability. The first graphics processing capability is received at the programmable driver interface from the shared library module based on the display panel parameter. The frame buffer is output to a display.

22 Claims, 8 Drawing Sheets

(51) Int. Cl.
    *G06F 15/00*    (2006.01)
    *G09G 5/39*     (2006.01)
    *G06T 1/20*     (2006.01)

(56) References Cited

U.S. PATENT DOCUMENTS

| | | | | |
|---|---|---|---|---|
| 9,058,483 | B2* | 6/2015 | Chen | G06F 21/51 |
| 2003/0200427 | A1* | 10/2003 | Kemp | G06F 9/4411 |
| | | | | 713/1 |
| 2004/0085572 | A1* | 5/2004 | Gomez | G06F 3/1204 |
| | | | | 358/1.15 |
| 2009/0282477 | A1 | 11/2009 | Chen et al. | |
| 2010/0013842 | A1* | 1/2010 | Green | G06T 1/00 |
| | | | | 345/522 |
| 2010/0245366 | A1* | 9/2010 | Nath | G06F 15/177 |
| | | | | 345/502 |
| 2011/0279749 | A1* | 11/2011 | Erinjippurath | G09G 3/3426 |
| | | | | 349/61 |
| 2012/0242672 | A1* | 9/2012 | Larson | G06T 1/20 |
| | | | | 345/522 |
| 2013/0002688 | A1* | 1/2013 | Zhu | G06F 3/1446 |
| | | | | 345/502 |
| 2014/0184623 | A1* | 7/2014 | Frascati | G06T 1/20 |
| | | | | 345/522 |
| 2014/0240331 | A1* | 8/2014 | Norton | G09G 5/006 |
| | | | | 345/520 |

OTHER PUBLICATIONS

"A Trip Through The Graphics Pipeline 2011, Part 2," Jul. 2, 2011(9 Pages) [Retrieved via internet at http://fgiesen.wordpress.com/2011/07/09/a-trip-through-the-graphics-pipeline-2011-index/].

English translation of Search Report communication in connection with Taiwanese Patent Application No. 104105395, completed May 26, 2016, 9 pages.

* cited by examiner

METHODS AND APPARATUS TO PROVIDE EXTENDED GRAPHICS PROCESSING CAPABILITIES

FIELD OF THE DISCLOSURE

The present disclosure relates generally to electronic displays and, more particularly, to methods, apparatus, and articles of manufacture to provide extended graphics processing capabilities.

BACKGROUND

Display subsystems of computer architectures and other electronic devices include display interface hardware that converts received information into graphical information to be displayed. The display interface hardware can be a graphics processor or controller that is connected between a central processing unit (CPU) and a display. In many computer systems and/or electronic devices, an operating system (OS) and/or applications do not send display information directly to the display interface hardware because operating systems and applications are often not programmed with the capabilities to output display information in whichever specific format is required by the display interface hardware to display graphical information on a display. Instead, computer systems and electronic devices communicate display information to OS-level device drivers that translate information from OS's and applications into the specific format required by the display interface hardware to show graphical information on a display. Sometimes, different display interface hardware will require completely different drivers that will translate information from OS's and applications into different specific formats required by those different display interface hardware.

Sometimes, graphics processing features required by some application are not provided in device drivers. To meet such needs, some applications are programmed with graphics processing features that are unique to the needs of those applications and that are not provided in a device driver corresponding to particular display interface hardware. For example, graphics-intensive personal computer (PC) game programs may be programmed to include custom rendering algorithms to maximize the graphics performance for those PC games. As such, graphics-intensive PC games can take advantage of better display capabilities to enhance a gaming experience based on the custom rendering algorithms built into the PC game programs.

DETAILED DESCRIPTION

Figure 1:
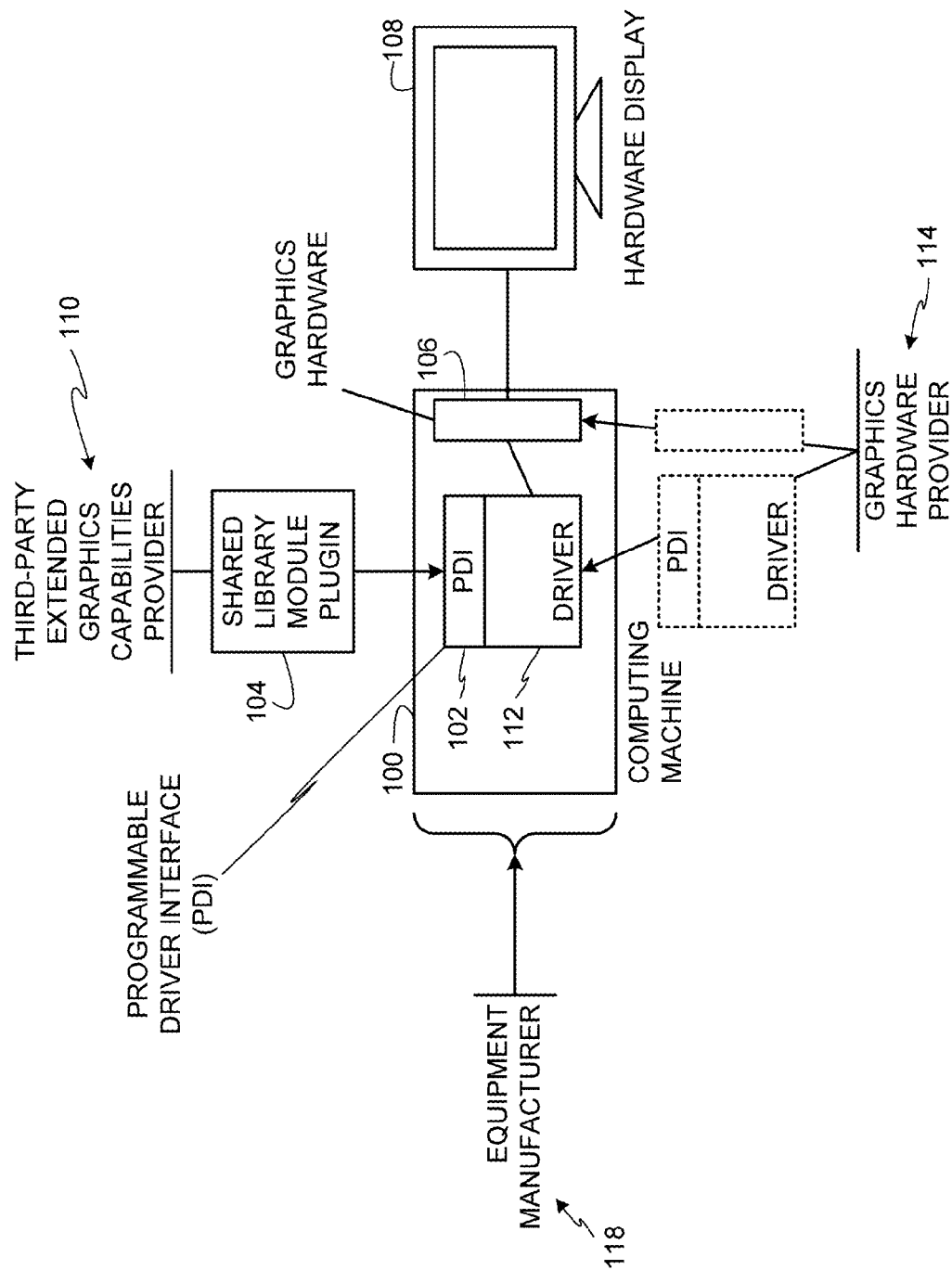
FIG. 1 is an example computing machine having a programmable driver interface (PDI) to provide extended graphics processing capabilities from an example shared library module plugin for use with graphics hardware and a hardware display.

Examples disclosed herein may be used to provide different extended graphics processing capabilities at a device driver level for use with display interface hardware of an electronic device. For example, disclosed examples may be used to implement device drivers that accept third-party add-ons or plug-ins having additional graphics processing capabilities than the graphics processing capabilities that are built in or statically programmed in the device drivers. The teachings of this disclosure are useful in connection with any type of device driver (e.g., device drivers for any type of peripheral device or subsystem of an electronic computing device). Examples disclosed herein are described in connection with display capabilities and graphics processing capabilities of electronic computing devices without limitation to such an application.

Prior display subsystems are designed to have a fixed set of graphics processing features that are used across numerous operating system processes and applications. Such graphics processing features are often provided in device drivers from equipment manufacturers of the display interface hardware. For example, an equipment manufacturer of a graphics adapter card for use in personal computers (PCs) will provide a device driver (e.g., software and/or firmware) that enables a particular operating system (OS) (e.g., a Windows® operating system, an Apple Mac® operating system, a UNIX operating system, etc.) to communicate with the graphics adapter card. In this manner, when applications call OS-level display functions to display information, the OS-level display functions can use the device driver for the graphics adapter card to send the information to be displayed to the graphics adapter card. That is, when the device driver receives the information for display from the OS-level display functions, the device driver provides the information to the graphics adapter card in a specific manner as required by the graphics adapter card. Implementing display subsystems in this manner allows the OS to be abstracted from the hardware level (e.g., the graphics adapter card) so that the OS need not be provided with numerous different functions to directly communicate with any graphics adapter hardware that may be incorporated into a computer system. That is, instead of increasing the size and complexity of an OS to be able to directly communicate with any graphics adapter hardware, the OS is designed so that it can interface with any graphics device driver via a standard interface.

The graphics device driver can be developed and provided by the manufacturer of the graphics adapter hardware. Graphics device drivers are typically developed or programmed by graphics hardware manufacturers to include graphics features that the manufacturer believes are useful across numerous applications and/or OS processes. Graphics hardware manufacturers may also program their device drivers to include graphics processing features that they believe will be in high demand among software developers based on the use of such graphics processing features in popular applications (e.g., popular graphics-intensive PC games).

Prior device drivers for graphics hardware are static or fixed in that third parties cannot add additional features to a device driver without rebuilding the device driver. As such, when a software developer programs an application needing a custom graphics processing feature, the software developer is required to incorporate such a custom feature into the application. Although this prior approach is a workable solution for a single application, the custom feature is available only to that single application and is not available outside of that application for use by other applications. A drawback to this prior approach is that the software developer will need to incorporate the same custom graphics processing feature into every one of the software developer's applications needing the graphics capabilities provided by that custom feature. Another drawback is that the software developer may not be able to take advantage of hardware acceleration capabilities available in the graphics hardware because the software developer implements the custom feature entirely in software so that it can be packaged in the software application.

Another drawback of such prior device drivers is that computer system builders or system integrators cannot easily add graphics processing features to a display subsystem of a computer without building a new device driver to incorporate such additional graphics processing features. For example, a PC manufacturer may want to include a gaming-specific graphics feature into a PC system targeted to gamers and may want to include a 3D modeling feature in a PC system targeted to professionals such as architects and engineers. To achieve such customer features, the PC manufacturer would need to develop its own graphics device driver which can be overly costly and time consuming. In some instances, the PC manufacturer may not be able to build its own device driver if the manufacturer of the graphics adapter hardware is not willing to provide hardware specifics or hardware configurations of the graphics adapter hardware needed to build a suitable device driver. Alternatively, the PC manufacturer could ask the manufacturer of the graphics adapter hardware used in the PC systems to incorporate the custom graphics features into the device driver developed by the manufacturer of the graphics adapter hardware.

Examples disclosed herein may be used to implement a programmable driver interface (PDI) framework that enables equipment manufacturers (e.g., PC manufacturers, original equipment manufacturers (OEMs), etc.) and/or software developers to incorporate custom graphics processing features at the device driver level of a display subsystem. In this manner, a graphics hardware manufacturer may provide graphics processing units (GPUs) and/or graphics adapter cards (e.g., a peripheral component interconnect (PCI) graphics card installable on a PC motherboard) to numerous PC equipment manufacturers along with a PDI device driver. Example PDI device drivers disclosed herein allow the PC equipment manufacturers to add their third-party custom graphics processing features to the display subsystems of their PCs so that application developers can make use of the third-party custom graphics processing features in their software applications. For example, a PC equipment manufacturer may incorporate a custom noise correction algorithm that is popular among software applications often used by its target customer base, and another PC equipment manufacturer may incorporate a 3D look up table (LUT) that is popular among software applications often used by its target customer base. Examples disclosed herein enable such third-party customization by allowing third parties to add custom graphics processing features at the device driver level so that equipment manufacturers can use hardware present on GPUs and/or display panels to implement their custom features.

Example PDI framework techniques disclosed herein enable custom image processing algorithms to be plugged into device driver stacks of graphics hardware. In some examples, the disclosed PDI framework is used in connection with shared libraries, which include a collection of functions that are shared across numerous applications that have access to that shared library. For example, example PDI framework techniques disclosed herein may be used to load secured custom shared libraries for use with a display/graphics device driver. The secured custom shared library can have custom graphics algorithms that may be used by any application that accesses the corresponding display device driver. Shared libraries are often referred to as dynamic-link libraries (DLLs), which are Microsoft's implementation of shared libraries.

In examples disclosed herein, after a custom shared library is loaded for use with a display device driver as part of the example disclosed PDI framework, one or more image processing algorithms provided in the custom shared library become available to applications in a GPU-friendly language (e.g., a pixel shader). Using the example PDI framework to load custom shared libraries enables loading custom image processing algorithms in a runtime environment in the same way for access by multiple applications. In addition, example PDI frameworks disclosed herein ensure that all display frame buffers are rendered via the additional custom image processing provided by the custom shared library. Some disclosed example PDI frameworks may also be integrated with capabilities to compensate for different environmental lighting conditions such as ambient color temperature, ambient lighting brightness, panel backlighting brightness, etc. Environmental lighting conditions may be affected by the type of light in which a display is used, the time of day, the weather (e.g., an overcast day versus a sunny day), whether backlighting or frontlighting is being used in connection with the display, etc.

Disclosed example methods involve sending a display panel parameter to a shared library module. In some such examples, the display panel parameter is sent by a programmable driver interface in communication between the shared library module and a device driver for graphics hardware. The shared library module includes a first graphics processing capability. The device driver includes a second graphics processing capability different from the first graphics processing capability. Some example methods also involve performing a render operation via the programmable driver interface on a frame buffer based on the first graphics processing capability. In some such examples, first graphics processing capability is received at the programmable driver interface from the shared library module based on the display panel parameter. The frame buffer is output to a display. In some examples, the rendering operation is performed on a first copy of the frame buffer maintained by the programmable driver interface separate from a second copy of the frame buffer maintained by the device driver. In some examples, the installed shared library module is in communication with the device driver via the programmable driver interface after the shared library module successfully completes a secure signing validation based on a certification process from a provider of the graphics hardware. In some examples, the shared library module is provided by a third party separate from a provider of the device driver and the graphics hardware. Some examples also involve installing the shared library module in communication with the device driver via the programmable driver interface after the device driver is provided as a compiled object code file. In some examples, changes in environmental lighting conditions changes how frame buffers are rendered. For example, a render operation of a first frame buffer may be based on first graphics processing parameters corresponding to first environmental lighting conditions information, and a second render operation of a second frame buffer may be based on second graphics processing parameters corresponding to second environmental lighting conditions information obtained based on a notification from a sensor monitor. Examples disclosed herein also include computer readable storage mediums comprising instructions that, when executed, cause a machine to perform operations of example methods disclosed herein.

Disclosed example apparatus include an extended graphics processing capabilities database to receive a display panel parameter, and a programmable driver interface that is in communication between the extended graphics processing capabilities database and a device driver for graphics hardware. In disclosed examples, the extended graphics processing capabilities database includes a first graphics processing capability, and the device driver includes a second graphics processing capability. The programmable driver interface of disclosed examples is configured to perform a render operation on a frame buffer based on the first graphics processing capability received at the programmable driver interface from the extended graphics processing capabilities database based on the display panel parameter. Disclosed example apparatus also include graphics hardware that includes a graphics processing unit to output the frame buffer to a display. In some examples, the programmable driver interface is configured to install the extended graphics processing capabilities database in communication with the device driver after the extended graphics processing capabilities database successfully completes a secure signing validation based on a certification process from a provider of the graphics hardware. In some examples, the extended graphics processing capabilities database is provided by a third party separate from a provider of the device driver and the graphics hardware. In some examples, the programmable driver interface is configured to install the extended graphics processing capabilities database in communication with the device driver after the device driver is provided as a compiled object code file. In some examples, the programmable driver interface is configured to perform the render operation on the frame buffer by performing the render operation on a first copy of the frame buffer maintained by the programmable driver interface separate from a second copy of the frame buffer maintained by the device driver. In some examples, the programmable driver interface is configured to perform the render operation on the frame buffer based on first graphics processing parameters corresponding to first environmental lighting conditions information, and the programmable driver interface is configured to perform a second render operation on a second frame buffer based on second graphics processing parameters corresponding to second environmental lighting conditions information obtained based on a notification from a sensor monitor. In some examples, when the graphics hardware device driver is compiled object code, the shared library module provides the first graphics processing capability via the programmable driver interface without recompiling the graphics hardware device driver.

Some disclosed example apparatus include a programmable driver interface means for performing a render operation on a frame buffer based on a first graphics processing capability received from an extended graphics processing capabilities database based on a display panel parameter. The programmable driver interface means may be in communication with a graphics hardware device driver. The graphics hardware device driver includes a second graphics processing capability different from the first graphics processing capability. Some such disclosed example apparatus also include graphics hardware means for outputting the frame buffer to a display. In some examples, the programmable driver interface means may be used for installing the extended graphics processing capabilities database in communication with the device driver after the extended graphics processing capabilities database successfully completes a secure signing validation based on a certification process from a provider of the graphics hardware.

Some disclosed example apparatus include graphics hardware to present information on a hardware display, and a device driver corresponding to the graphics hardware. The device driver includes a first graphics processing capability to process the information for presenting on the hardware display. Disclosed example apparatus also include a programmable driver interface in communication with the device driver. The programmable driver interface is to enable a third party to add a second graphics processing capability for use with the graphics hardware without recompiling the device driver. In some examples, the graphics hardware includes a graphics processing unit. In some examples, the first graphics processing capability is in a compiled object code file of the device driver when the third party is enabled to add the second graphics processing capability via the programmable driver interface. In some such examples, the programmable driver interface enables the third party to add the second graphics processing capability without recompiling the device driver by adding the second graphics processing capability in at least one of a shared library module plugin or a database to be in communication with the programmable driver interface without recompiling a source code file corresponding to the compiled object code file. In some examples, the second graphics processing capability is accessible by an operating system and a plurality of applications in a same runtime environment. In some examples, the device driver and the programmable driver interface enable an operating system and an application to send the information to the graphics hardware without needing specific hardware configurations and/or communication configurations of the graphics hardware.

FIG. 1 is an example computing machine 100 (e.g., an apparatus) having an example programmable driver interface (PDI) 102 constructed in accordance with the teachings of this disclosure to provide extended graphics processing capabilities from an example shared library module plugin 104 (e.g., an add-on module, a dynamic-link library (DLL), etc.) for use with example graphics hardware 106 and an example hardware display 108. In the illustrated example, the PDI 102 is referred to as programmable because it is programmable by a third-party extended graphics capabilities provider 110 without needing to rebuild/recompile a device driver 112. That is, in the illustrated example, a graphics hardware provider 114 develops and/or manufactures the graphics hardware 106. The graphics hardware 106 could be, for example, a GPU and/or a graphics hardware adapter (e.g., a graphics adapter card) that includes a GPU. In addition, to allow an operating system (OS) and/or applications to communicate with the graphics hardware 106, the graphics hardware provider 114 also develops the device driver 112 (e.g., a graphics hardware device driver). In the illustrated example of FIG. 1, the graphics hardware provider 114 provides the PDI 102, the device driver 112, and the graphics hardware 106 to the equipment manufacturer 114, as represented by broken lines in FIG. 1, to incorporate the PDI 102, the device driver 112, and the graphics hardware 106 in the example computing machine 100. The device driver 112 of the illustrated example allows the OS and/or applications (e.g., the OS and/or applications of the example computing machine 100) to communicate with the graphics hardware 106 to display information on the hardware display 108 without needing to know specific hardware and/or communication configurations that may be unique to the GPU and/or other integrated circuits of the graphics hardware 106 and/or the hardware display 108 (e.g., a liquid crystal display (LCD), a light emitting diode (LED) display, a cathode ray tube (CRT) display, a projector, a wearable eyewear display, a mobile device display, etc.). Thus, the OS and/or applications can communicate information to the graphics hardware 106 via the device driver 112 at a high-level communication language used by the OS and/or applications, and the device driver 112 of the illustrated example can translate the communications from the OS and/or applications to low-level hardware communications for the graphics hardware 106. To facilitate such communications between the OS/applications and the graphics hardware 106, the device driver 112 of this example is provided with numerous graphics hardware processing functions (e.g., graphics processing capabilities) ranging from simple display operations to complex image processing. For example, a simple display operation could involve writing to a display buffer for presenting information on the hardware display 108. A complex display operation could involve performing a pixel-shading process. Graphics hardware processing functions, or graphics processing capabilities, could be functions to process any aspect (e.g., color, sharpness, gamma, shadowing, shading, anti-aliasing, etc.) of any type of display information including text, images, video, etc.

During the development phase of the device driver 112 of the illustrated example, programming personnel (e.g., one or more programmers employed or contracted by the graphics hardware provider 114) write(s) software and/or firmware into source code files using a human-readable programming language that allows the programming personnel to add, modify, and/or delete functionality from the source code files. The human-readable source code files are not executable by a processor (e.g., a central processing unit (CPU) of the computing machine 100 of FIG. 1). However, when the programming personnel finishes programming the graphics hardware processing functions into the source code files, the source code files are compiled into one or more machine readable and executable object code files that form the device driver 112 of the illustrated example. In this example, the object code files are executable by a processor, but do not contain human-readable language that would allow a programmer to modify and/or add additional capabilities to the device driver 112. Thus, when the graphics hardware provider 114 provides the device driver 112 and the graphics hardware 106 to an equipment manufacturer 118 (e.g., the equipment manufacturer of the computing machine 100) for installation and use in the computing machine 100, the device driver 112 is static in that it is not modifiable by the equipment manufacturer 118 to customize the display capabilities of the computing machine 100 by adding additional display/graphics processing capabilities.

Examples disclosed herein provide the PDI 102 to enable a third party 110 to provide extended graphics processing capabilities in the shared library module plugin 104 to supplement the graphics processing capabilities of the device driver 112. For example, the third party 110 may develop additional graphics processing capabilities that are not incorporated into the device driver 112 but that the third party 110 elects to enable for use across one or more applications and/or for use on an OS to process graphics information for displaying on the hardware display 108. Thus, even if the graphics hardware provider 114 does not include some desirable functionality in the device driver 112 for use with the graphics hardware 106, the PDI 102 of the illustrated example (which is in communication with the device driver) enables the third party 110 to provide any additional functionality in the shared library module plugin 104 that is not already programmed in the device driver 112 (e.g., provide one or more graphics processing capabilities in the shared library module plugin 104 that is/are different from the graphics processing capabilities of the device driver 112) so that graphics processing capabilities of the device driver 112 and the graphics hardware 106 can be extended even after the graphics hardware provider 114 delivers the non-modifiable device driver 112.

In some examples, the third party 110 may be separate from the equipment manufacturer 118 and the graphics hardware provider 114. For example, the third party 110 may be an application developer that develops multiple applications that use advanced graphics processing functions that are not incorporated in the device driver 112. In such examples, the third party 110 may program the advanced graphics processing functions in the shared library module plugin 104 so that those functions can be accessed across numerous applications executed by the computing machine. In other examples, the third party 110 and the equipment manufacturer 118 may be the same entity. For example, the equipment manufacturer 118 may develop and manufacture the computing machine 100 for a particular market segment that uses particular types of graphics processing capabilities that are not in the device driver 112. For example, the equipment manufacturer 118 may target the computing machine 100 to PC gamers and may want to include a gaming-specific graphics feature in the shared library module plugin 104. Alternatively, the equipment manufacturer 118 may target the computing machine 100 to professionals such as architects and engineers and may want to include a 3D modeling feature in the shared library module plugin 104.

In some examples, the graphics hardware provider 114 may provide a shared library module plugin 104 instead of or in addition to a shared library module plugin 104 being provided by the third party 110. For example, the graphics hardware provider 114 may provide a baseline of functionality in the device driver 112 that includes typical graphics processing capabilities used by a majority of applications and/or an operating system. To supplement the graphics processing capabilities of the baseline device driver 112 with unique or specific graphics processing capabilities used by specific market segments, the graphics hardware provider 114 may provide one or more shared library module plugins 104 to interface with the PDI 102.

Regardless of what entity provides shared library module plugins 104, in addition to providing additional graphics processing capabilities, shared library module plugins 104 are also useful to protect intellectual property in the additional graphics processing capabilities. For example, the third party 110 may develop a proprietary graphics processing capability for which it wishes to control usage rights. For example, the third party 110 may want to provide a shared library module plugin 104 only to customers that are willing to pay for the additional graphics processing capabilities in the shared library module plugin 104 and/or only to customers that execute an end user license agreement (EULA).

In some examples, the PDI 102 is provided with security features that allow only secured third-party shared library plugins (e.g., the shared library module plugin 104) to be loaded/installed. For example, when the PDI 102 is provided with such security features, the PDI 102 requires that third-party shared library plugins successfully pass a secure signing process. Such a signing process may be based on a certification process (e.g., based on a digital certificate) provided by the graphics hardware provider 114.

Figure 2:
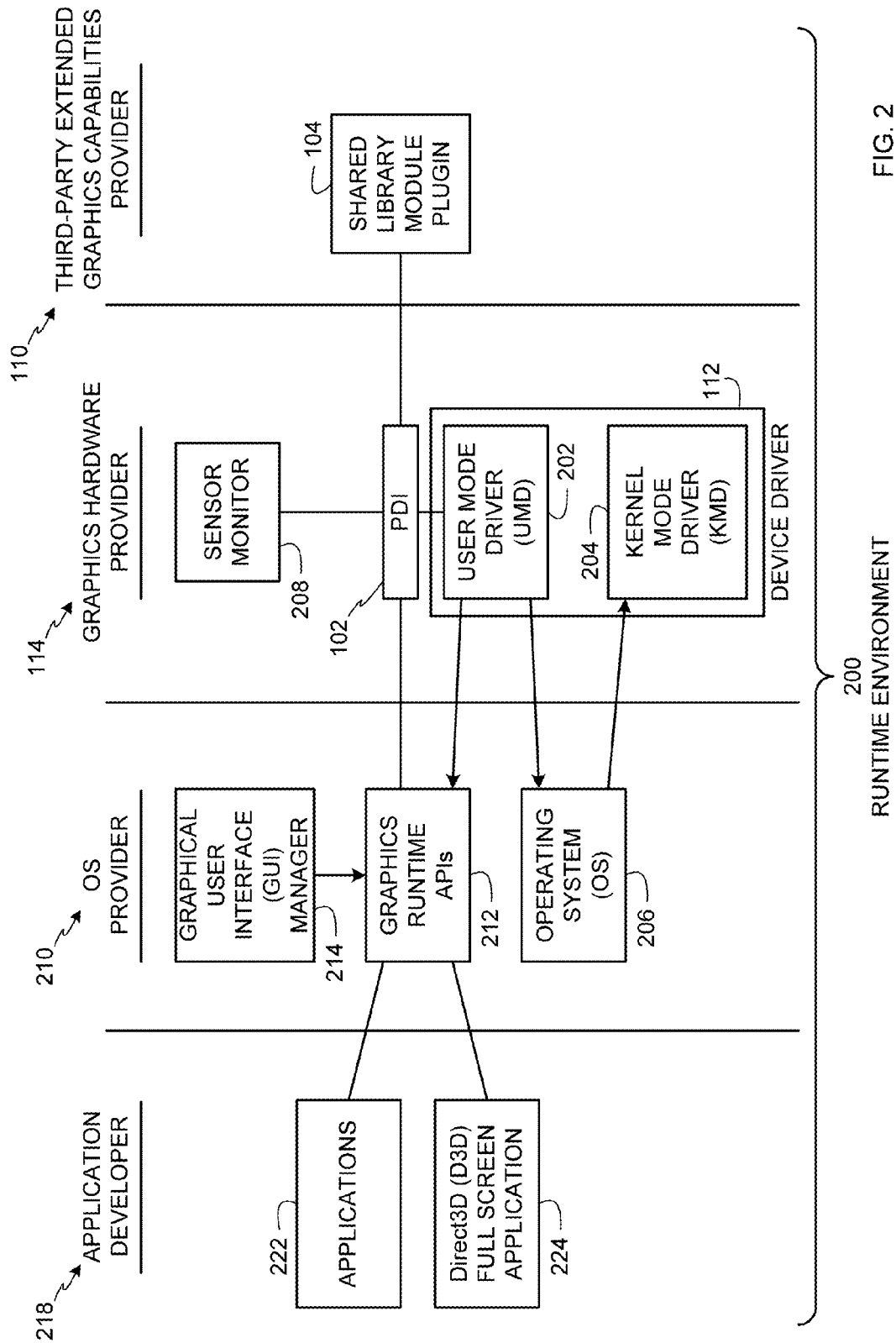
FIG. 2 depicts the example programmable driver interface and the example shared library module plugin of FIG. 1 in an example runtime environment of the computing machine of FIG. 1.

FIG. 2 depicts the example PDI 102 and the example shared library module plugin 104 of FIG. 1 in an example runtime environment 200 of the computing machine 100 of FIG. 1. The example runtime environment 200 is shown with numerous components provided by different entities. The third-party extended graphics capabilities provider 110 of the illustrated example provides the shared library module plugin 104. The example shared library module plugin 104 includes extended graphics processing capabilities such as image processing algorithms. The example shared library module plugin 104 also includes hardware settings and parameter values for use with the graphics hardware 106 of FIG. 1 to implement the extended graphics processing capabilities. For example, the shared library module plugin 104 may provide compiled shader code, surface type information, and/or register information. Example compiled shader code may be, for example, an image processing algorithm to render a frame buffer using different shading effects. Example surface type information may be used to describe the type of display/graphics information that is to be rendered such as an engine-managed surface (e.g., a device-independent surface), a device-managed surface, etc. Example register information may be used to specify hardware registers of the graphics hardware 106 (FIG. 1) to be used for different graphics processing capabilities of the shared library module plugin 104.

In the illustrated example, the graphics hardware provider 114 provides the device driver 112 and the PDI 102. The device driver 112 of the illustrated example may be run as a user mode driver (UMD) 202 and/or as a kernel mode driver (KMD) 204. A UMD 202 may be instantiated at runtime for a particular application so that the UMD 202 only has access to memory space allocated to the particular application. A KMD 204 may be instantiated at runtime to access memory space of an operating system that is allocated for processes of an OS 206. In the illustrated example, the example PDI 102 is in communication with the UMD 202, the UMD 202 is in communication with the OS 206, and the OS 206 is in communication with the KMD 204. In the example runtime environment 200 of FIG. 2, the UMD 112 is configured to render processes requested by an application. The example KMD 204 is configured to submit commands and/or display information to the graphics hardware 106 (FIG. 1) and is also configured to perform graphics processing functions programmed into the device driver 112.

In the illustrated example, the PDI 102 is a layer on the UMD 202 and operates to intercept rendering requests (e.g., requests to render/create graphics such as GFX images, text, video, etc.) and presentation requests (e.g., requests to display information on the hardware display 108). In addition, the example PDI 102 maintains it's own copies of frame buffers (e.g., memory locations at which graphics are stored in memory during a rendering phase). For presentation requests (e.g., a function call from an application or an OS) involving graphics processing capabilities provided by the shared library module plugin 104, the example PDI 102 performs one or more extra render operation(s) to create a new frame buffer based on one or more graphics processing capability(ies) in the shared library module plugin 104 and to display the newly rendered frame buffer on the hardware display 108. In the illustrated example, the PDI 102 provides the frame buffers that it generates for displaying on the hardware display 108 instead of the device driver 112 providing OS frame buffers for displaying on the hardware display 108. In this manner, the frame buffers output to the hardware display 108 are display buffers that have been processed using the one or more extended graphics processing capability(ies) in the shared library module plugin 104.

In the illustrated example, the graphics hardware provider 114 also provides an example sensor monitor 208. The sensor monitor 208 of the illustrated example uses OS-provided services to register for sensor event notifications corresponding to changes in environmental lighting conditions (e.g., detected by a light sensor) such as ambient color temperature, ambient lighting brightness, panel backlighting brightness, etc. that affect viewing of the hardware display 108. Environmental lighting conditions may be affected by the type of light in which a display is used, the time of day, the weather (e.g., an overcast day versus a sunny day), whether backlighting or frontlighting is being used in connection with the display, etc. In the illustrated example, when the sensor monitor 208 receives a sensor event notification from the OS 206, the sensor monitor 208 communicates sensor information to the example PDI 102 about changes in ambient light, color temperature, panel backlighting, and/or any other environmental lighting condition. The example PDI 102 of FIG. 2 then sends the sensor information to the shared library module plugin 104.

In the illustrated example, an OS provider 210 provides the example OS 206, example graphics runtime application programming interfaces (APIs) 212, and an example graphical user interface (GUI) manager 214. The OS 206 of the illustrated example may be, for example, a Windows OS, an Apple Mac OS, a UNIX OS, a Linux OS, a portable device OS, an embedded OS, and/or any other OS. The graphics runtime APIs 212 are a collection of graphics APIs that can be called by applications to process and/or display graphics information. Example graphics runtime APIs are DirectX® runtime APIs provided by Microsoft® corporation. The example GUI manager 214 is provided to manage graphical user interface elements of the OS 206 such as windows, controls, menus, etc. with which a user interfaces on a screen. An example GUI manager 214 is the Microsoft® Desktop Window Manager (DWM).

In the illustrated example, an application developer 218 provides applications 222 that call the graphic runtime APIs 212 to use graphics processing capabilities of the PDI 102 and/or the UMD 202. The application developer 218 may provide different applications that use the graphics processing capabilities of the PDI 102. An example application shown in FIG. 2 is a Direct3D (D3D) full screen application 224.

Figure 3:
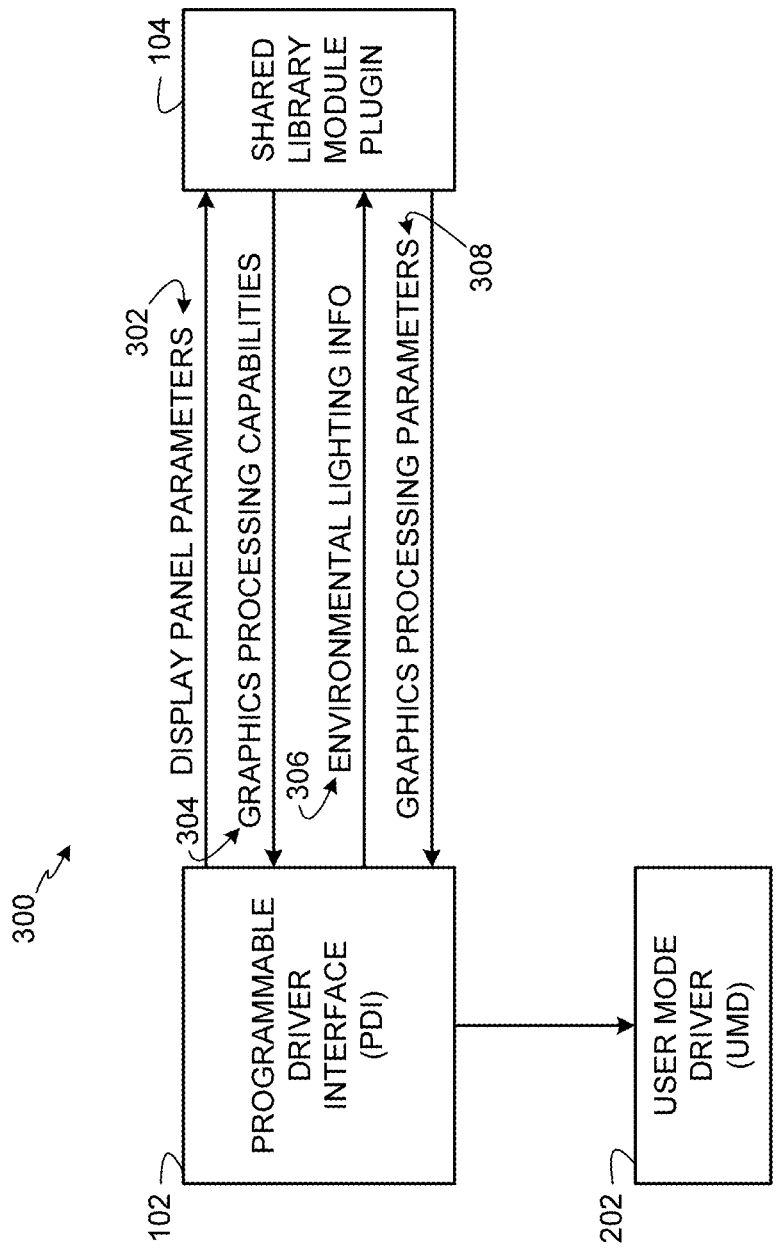
FIG. 3 illustrates example communications between the example programmable driver interface and the example shared library module plugin of FIG. 1.

FIG. 3 illustrates example communications 300 between the example PDI 102 and the example shared library module plugin 104. In the illustrated example of FIG. 3, the shared library module plugin 104 implements an image processing algorithm based on a pixel shader capability. In the illustrated example, the example PDI 102 obtains information about environmental lighting conditions such as ambient color temperature, ambient lighting brightness, panel backlighting brightness, etc. from the OS by using OS callback registration processes (e.g., using the graphics runtime API's 212 of FIG. 2) and uses the environmental lighting conditions information during an interface handshake process 300 with the shared library module plugin 104 to initialize the shared library module plugin 104 for use with the graphics hardware 106 and the hardware display 108 of FIG. 1.

The illustrated example of FIG. 3 shows how the example interface handshake 300 is performed between the example PDI 102 and the example shared library module plugin 104. In the illustrated example, the PDI 104 sends one or more display panel parameter(s) 302 to the example shared library module plugin 104. In the illustrated example, the one or more display panel parameter(s) 302 (e.g., gamma information, color gamut information, etc.) correspond to hardware configurations, display capabilities, features, etc. of the graphics hardware 106 and/or the hardware display 108. The example shared library module plugin 104 returns one or more graphics processing capabilities 304 (e.g., instructions, functions, algorithms, etc.) provided in the shared library module plugin 104 based on the one or more display panel parameter(s) 302. The example PDI 102 uses the graphics processing capabilities 304 from the shared library module plugin 104 to process frame buffers of display data before providing the processed frame buffers for presenting via the hardware display 108.

In the illustrated example, the PDI 102 sends environmental lighting conditions information 306 to the shared library module plugin 104. In response to the environmental lighting conditions information, the example shared library module plugin 104 provides one or more graphics processing parameter(s) 308 (e.g., register values for the graphics hardware 106, brightness settings, etc.) to the example PDI 102. For example, if a graphics processing capability 304 provided by the shared library module plugin 104 to the PDI 102 is a pixel shader, the graphics processing parameters 308 may include pixel shader parameters to enable the PDI 102 to use the pixel shader capabilities of the shared library module plugin 104. That is, the graphics processing parameters 308 provide the PDI 102 with settings or values to be used by the PDI 102 to implement the graphics processing capabilities 304 on one or more frame buffers. In some examples, when the sensor monitor 208 receives a notification event from the OS 206 of a change in environmental lighting conditions, the example PDI 102 informs the shared library module plugin 104 of the updated graphics processing parameters 308 representative of the changes. In response to the updated graphics processing parameters 308, the shared library module plugin 104 sends one or more updated graphics processing parameters 308 to the example PDI 102 to apply to subsequent frame buffers of display data before presenting the frame buffers on the hardware display 108. For example, when the environmental lighting conditions change, visual effects applied to frame buffers may need to be changed to compensate for the new lighting conditions so that graphics on the hardware display 108 appear at the same or similar quality sought to be achieved by the third party 110 regardless of changes in environmental lighting characteristics.

Figure 4:
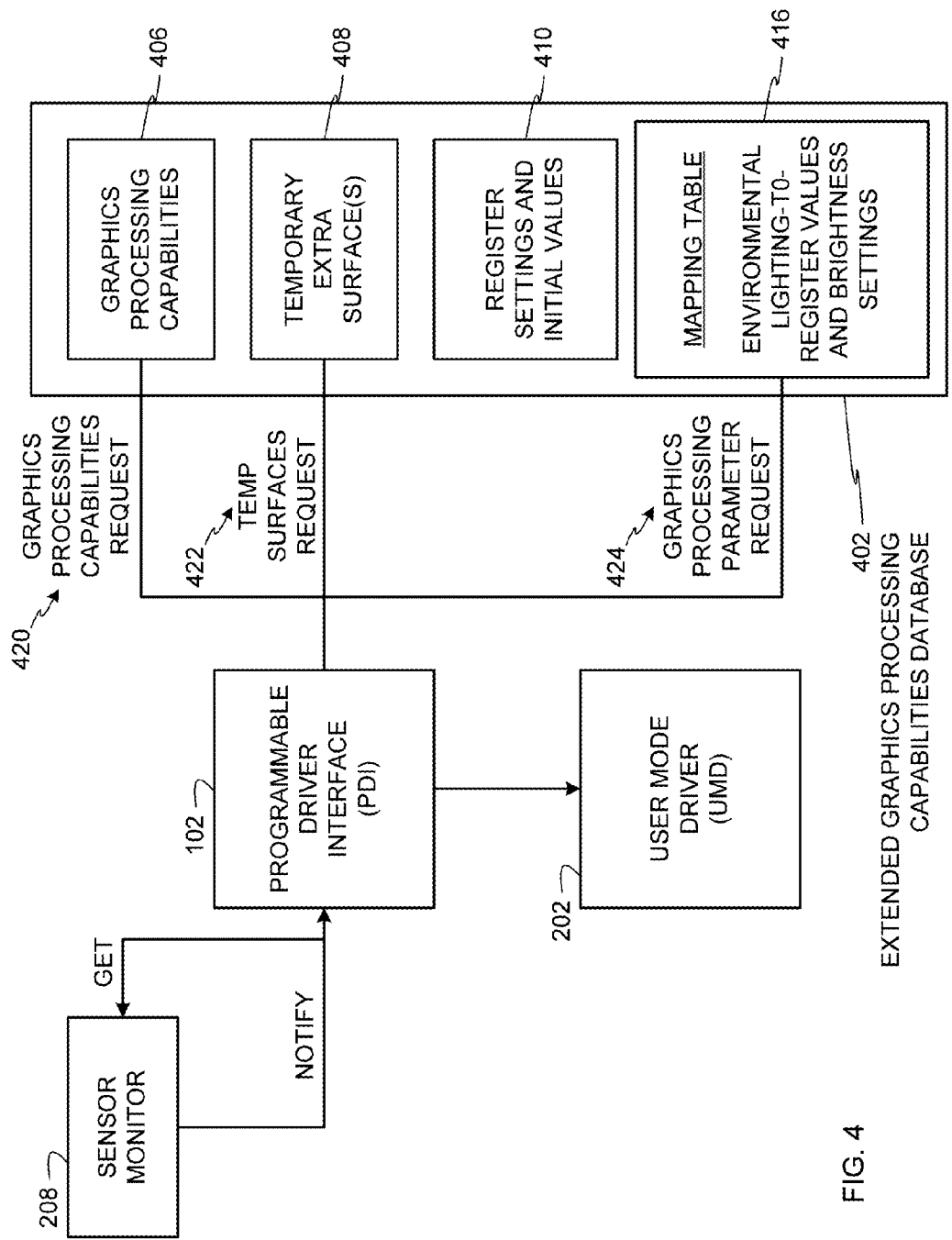
FIG. 4 is another example that may be used to provide extended graphics processing capabilities for use with graphics hardware and a hardware display of FIG. 1.

In some examples, the example shared library module plugin 104 of FIGS. 1-3 is able to run CPU code (e.g., machine instructions executed by a central processing unit (CPU)). However, some entities may not want to allow use of a plugin that is able to run such CPU code. As such, FIG. 4 illustrates another example that may be used to provide extended graphics processing capabilities for use with the graphics hardware 106 and the hardware display 108 of FIG. 1 without needing to provide a plugin that is capable of running CPU code. In the illustrated example of FIG. 4, instead of using the shared library module plugin 104 of FIGS. 1-3, which can run CPU code, an example extended graphics processing capabilities database 402 shown in FIG. 4 includes extended graphics processing capabilities to be shared across numerous applications and OS processes. The example of FIG. 4 is useful to increase security in computer processing because the database 402 is not able to run CPU code. For example, using the example database 402 of extended graphics processing capabilities decreases the risk of intrusion by malicious code. That is, while malicious code could infiltrate the computing machine 100 of FIG. 1 through a shared library, such malicious code is less likely to infiltrate the computing machine 100 through the database 402 because the database 402 does not run CPU code. As such, some entities may find the example of FIG. 4 useful for use in secure computing environments.

In the illustrated example of FIG. 4, the PDI 102 is in communication with the example database 402. The example database 402 may also be provided by a third party such as the third-party graphics capabilities provider 110 of FIGS. 1-3. The example database 402 is provided with one or more example graphics processing capabilities 406, one or more example temporary extra surface(s) 408, example register settings and initial values 410, and an example mapping table 416 to map environmental lighting condition values to register values and brightness settings. In the illustrated example, the graphics processing capabilities 406 specify extended graphics processing capabilities that are provided by the database 402. In the illustrated example, the PDI 102 sends the database 402 a graphics processing capabilities request 420 to request the graphics processing capabilities 406. For example, if the graphics processing capabilities 406 include a pixel shader, the database 402 may send the PDI 102 a shader file that specifies the type of pixel shader capabilities provided by the database 402. In some examples, the graphics processing capabilities request 420 includes display panel parameters (e.g., gamma information, color gamut information, etc.) corresponding to hardware configurations, display capabilities, features, etc. of the graphics hardware 106 and/or the hardware display 108 of FIG. 1.

In the illustrated example, the temporary extra surface(s) 408 provide example surface type information such as the type of display/graphics information that is to be rendered such as an engine-managed surface (e.g., a device-independent surface), a device-managed surface, etc. In the illustrated example, the PDI 102 sends a temporary surfaces request 422 to the database 402 to request one or more of the temporary extra surfaces 408. In the illustrated example, the temporary extra surfaces 408 are temporary because they are used to temporarily replace or override a surface set in the UMD 202.

The register settings and initial values 410 of the illustrated example specify hardware registers of the graphics hardware 106 (FIG. 1) and their configuration values to be used for different graphics processing capabilities provided by the database 402. In the example mapping table 416, values of environmental lighting conditions (e.g., ambient color temperature, ambient lighting brightness, panel backlighting brightness, etc.) are mapped to register values (e.g., register values for the graphics hardware 106) and brightness settings for use with the graphics hardware 106 (FIG. 1) to implement the graphics processing capabilities 406 provided by the database 402. The register values and brightness settings of the mapping table 416 provide the same or similar type of information as provided in the graphics processing parameters 308 of FIG. 3 by the shared library module plugin 104. For example, if a graphics processing capability 406 provided by the database 402 is a pixel shader, the register values and brightness settings of the example mapping table 416 include pixel shader parameters to enable the PDI 102 to use the pixel shader capabilities of the database 402. That is, the register values and brightness settings of the example mapping table 416 provide graphics processing parameters to the PDI 102 to specify settings or values for use with the graphics hardware 106 to apply the graphics processing capabilities 406 to one or more frame buffers. For example, when the PDI 102 provides environmental lighting condition measures (e.g., the environmental lighting conditions information 306 of FIG. 3) to the database 402, the database 402 returns register values and brightness settings to the PDI 102 that correspond to the environmental lighting condition measures. In the illustrated example, the PDI 102 sends a graphics processing parameter request 424 to the database 402 to provide the database 402 with the environmental lighting conditions information 306 (FIG. 3) to request corresponding register values and brightness settings from the mapping table 416. In the illustrated example, when the sensor monitor 208 notifies the PDI 102 of updated environmental lighting conditions information, the PDI 102 provides the updated environmental lighting conditions information to the database 402. In response, the database 402 provides the PDI 102 with updated graphics processing parameters from the mapping table 416.

To update the database 402 with other extended graphics processing capabilities, the third party 110 of FIG. 1 can provide updated versions of the database 402 storing additional information in the graphics processing capabilities 406, the temporary extra surface(s) 408, the register settings and/or initial values 410, and/or the mapping table 416. In some examples, the PDI 102 may be provided with security features that allow only secured databases to be loaded. For example, when the PDI 102 is provided with such security features, the PDI 102 requires that third-party databases successfully pass a secure signing process. Such a signing process may be based on a certification process provided by the graphics hardware provider 114.

Figure 5:
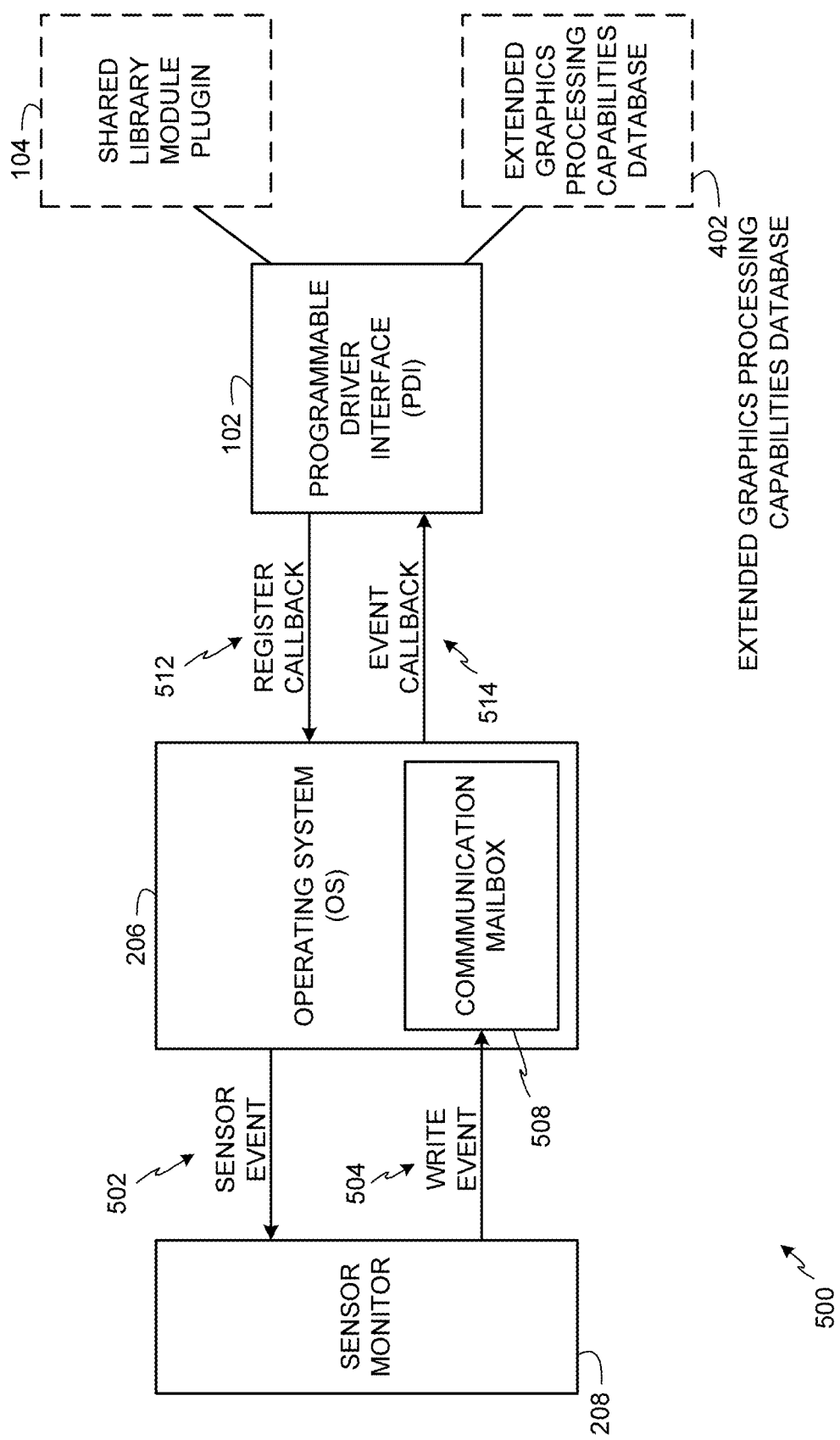
FIG. 5 illustrates an example environmental lighting conditions framework showing how an operating system communicates with the example sensor monitor of FIGS. 2 and 4 and the programmable driver interface (PDI) of FIGS. 1-4.

FIG. 5 is an example environmental lighting conditions framework 500 showing how the example OS 206 (FIG. 2) communicates with the example sensor monitor 208 (FIGS. 2 and 4) and the example PDI 102 (FIGS. 1-4). The example environmental lighting conditions framework 500 of FIG. 5 may be used in connection with the shared library module plugin 104 of FIGS. 1-3 and/or with the extended graphics processing capabilities database 402 of FIG. 4. The example environmental lighting conditions framework 500 can use OS-provided services to register and be notified of sensor events corresponding to changes in ambient color temperature, ambient lighting brightness, panel backlighting brightness, and/or any other environmental lighting condition. In the illustrated example of FIG. 5, the sensor monitor 208 is provided to receive sensor events 502 from the OS 206, and to provide the example PDI 102 with corresponding updated environmental lighting conditions information. In some examples, the sensor event 502 sent by the OS 206 to the sensor monitor 208 includes the updated environmental lighting conditions information. In other examples, the sensor event 502 is a notification that causes the sensor monitor 208 to request or retrieve the updated environmental lighting conditions information from the OS 206 and/or from another subsystem (e.g., a sensor subsystem of the computing machine 100 of FIG. 1).

In the illustrated example, the PDI 102 sends the updated environmental lighting conditions information to the shared library module plugin 104 and/or to the database 402 using a write event 504. For example, the sensor monitor 208 of the example of FIG. 5 sends the write event 504, including the updated environmental lighting conditions information, to a communication mailbox 508 of the OS 206. In the illustrated example, to receive updated environmental lighting conditions information at the PDI 102, the PDI 102 uses a register callback communication 512 to register a callback with the OS 206. The register callback 512 from the PDI 102 of the illustrated example is to register a callback corresponding to the sensor monitor 208. In this manner, when the sensor monitor 208 writes updated environmental lighting conditions information to the communication mailbox 508, the OS 206 can use an event callback 514 registered to the PDI 102 to send the PDI 102 the updated environmental lighting conditions information from the communication mailbox 508.

While example manners of implementing the example computing machine 100 (e.g., an apparatus) of FIG. 1 including the example PDI 102, the example device driver 112, the example shared library module plugin 104, and the example sensor monitor 208 are illustrated in FIGS. 1-5, one or more of the elements, processes and/or devices illustrated in FIGS. 1-5 may be combined, divided, re-arranged, omitted, eliminated and/or implemented in any other way. Further, the example PDI 102, the example device driver 112, the example shared library module plugin 104, and the example sensor monitor 208 of FIGS. 1-5 and/or, more generally, the example computing machine 100 of FIG. 1 may be implemented by hardware, software, firmware and/or any combination of hardware, software and/or firmware. Thus, for example, any of the example PDI 102, the example device driver 112, the example shared library module plugin 104, and the example sensor monitor 208 and/or, more generally, the example computing machine 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example PDI 102, the example device driver 112, the example shared library module plugin 104, and/or the example sensor monitor 208 is/are hereby expressly defined to include a tangible computer readable storage device or storage disk such as a memory, a digital versatile disk (DVD), a compact disk (CD), a Blu-ray disk, etc. storing the software and/or firmware. Further still, the example computing machine 100 of FIG. 1 may include one or more elements, processes and/or devices in addition to, or instead of, those illustrated in FIGS. 1-5, and/or may include more than one of any or all of the illustrated elements, processes and devices.

In some examples, the PDI 102 is implemented using any suitable programmable driver interface means. Such driver interface means are in communication with a graphics hardware device driver (e.g., the device driver 112 of FIGS. 1 and 2). Example programmable driver interface means include any or all of a logical circuit, a hardware processor, an ASIC, etc. configured or programmed using machine readable instructions to perform the operations and processes disclosed herein in connection with the PDI 102. In addition, in some examples, the graphics hardware 106 of FIG. 1 may be implemented using any suitable graphics hardware means for receiving frame buffers from the programmable driver interface means and for outputting the frame buffers for display on the hardware display 108 of FIG. 1. Example graphics hardware means include any or all of a GPU, a graphics adapter card, a graphics chipset, etc. Such graphics hardware means may be in communication between the hardware display 108 and the programmable driver interface means and between the hardware display 108 and the graphics hardware device driver 112.

Figure 6:
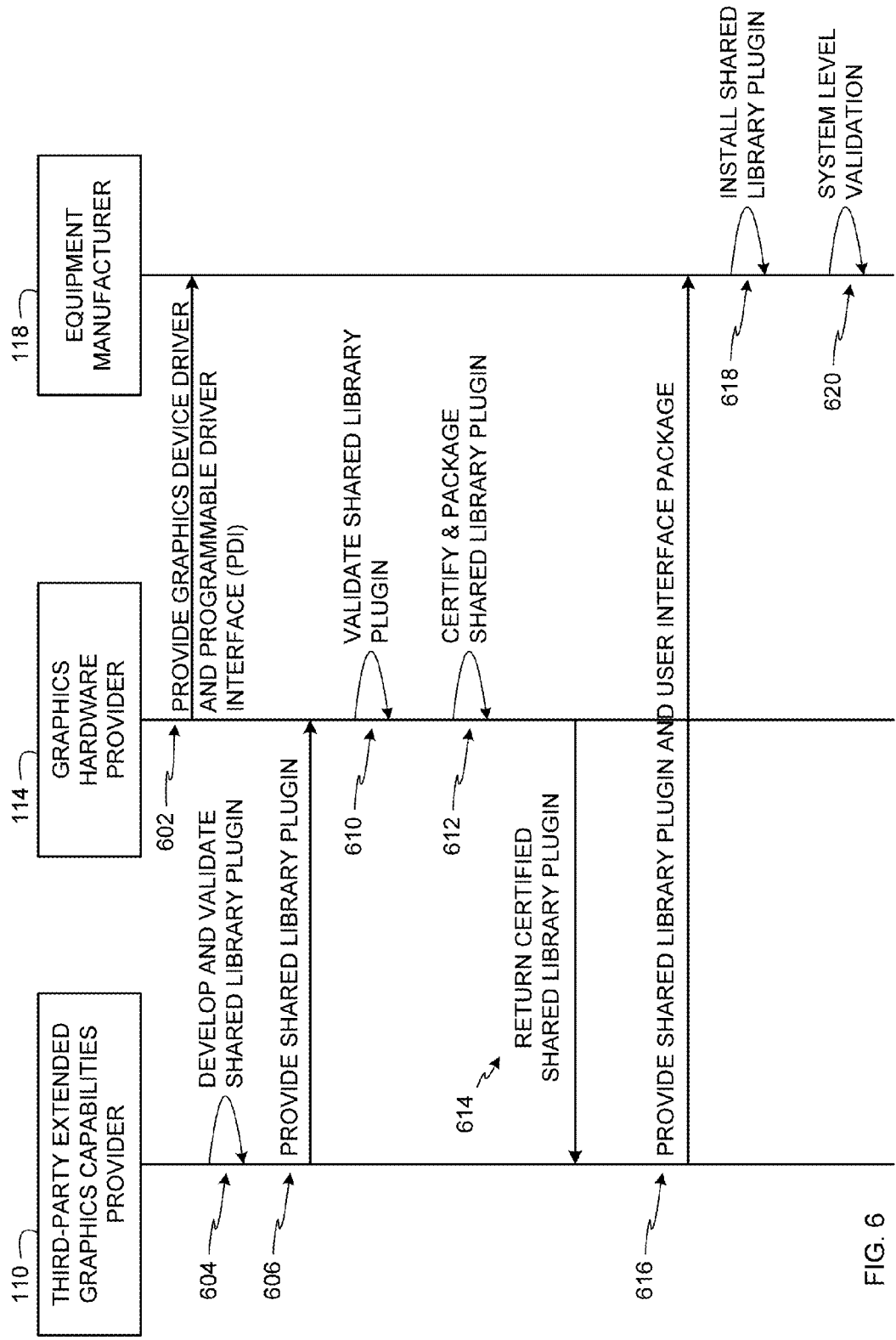
FIG. 6 depicts an example process flow between a third-party extended graphics capabilities provider, a graphics hardware provider, and an equipment manufacturer of FIG. 1.

FIG. 6 depicts an example process flow 600 between the example third-party extended graphics capabilities provider 110, the example graphics hardware provider 114, and the example equipment manufacturer 118 of FIG. 1 to provide the PDI 102 and the shared library module plugin 104 to the computing machine 100 of FIG. 1. In the illustrated example, the graphics hardware provider 114 provides the graphics device driver 112 and the PDI 102 of FIGS. 1-4 to the equipment manufacturer 118, as indicated at reference numeral 602. The third-party extended graphics capabilities provider 110 of the illustrated example develops and validates the shared library module plugin 104, as indicated at reference numeral 604. The example third-party extended graphics capabilities provider 110 provides the shared library module plugin 104 to the graphics hardware provider 114, as indicated at reference numeral 606. The example graphics hardware provider 114 validates the shared library module plugin 104, as indicated at reference numeral 610. In addition, after the shared library module plugin 104 has been validated, the example graphics hardware provider 114 certifies and packages the shared library module plugin 104, as indicated at reference numeral 612. The example graphics hardware provider 114 also returns the certified shared library module plugin 104 to the third party 110, as indicated at reference numeral 614. The third party 110 of the illustrated example provides the shared library module plugin 104 and a corresponding user interface package to the equipment manufacturer 118, as indicated at reference numeral 616. The equipment manufacturer 118 of the illustrated example installs the shared library module plugin 104 in the computing machine 100 (FIG. 1), as indicated at reference numeral 618. For example, the equipment manufacturer 118 installs the shared library module plugin 104 in communication with the PDI 102. In addition, the equipment manufacturer 118 of the illustrated example performs a system level validation of the shared library module plugin 104 in the computing machine 100, as indicated at reference numeral 620. When the system level validation is successful, the shared library module plugin 104 is successfully installed in communication with the PDI 102 in the computing machine 100 to provide extended graphics processing capabilities provided by the third party 110 in the shared library module plugin 104.

In some examples, the example PDI 102 disclosed herein requires the graphics hardware provider 114 to modify a UMD (e.g., an original user mode driver for a particular GPU) to create the UMD 202 of FIGS. 2-4 so that the PDI 102 can maintain context information across the UMD 202 and the example PDI 102. For example, by maintaining such context, when the OS 206 (FIGS. 2 and 5) and/or the UMD 202 refers to a shared private OS resource, the example PDI 102 is aware of how to access the shared private OS resource. To implement such context awareness across the UMD 202 and the example PDI 102, the UMD 202 facilitates storing private resource information that may be subsequently required by the example PDI 102. Although the process flow 600 of FIG. 6 is described in connection with providing the shared library module plugin 104, the same or a similar process flow may be used to provide the extended graphics process capabilities database 402 of FIG. 4 for use with the PDI 104 in the computing machine 100.

Figure 7:
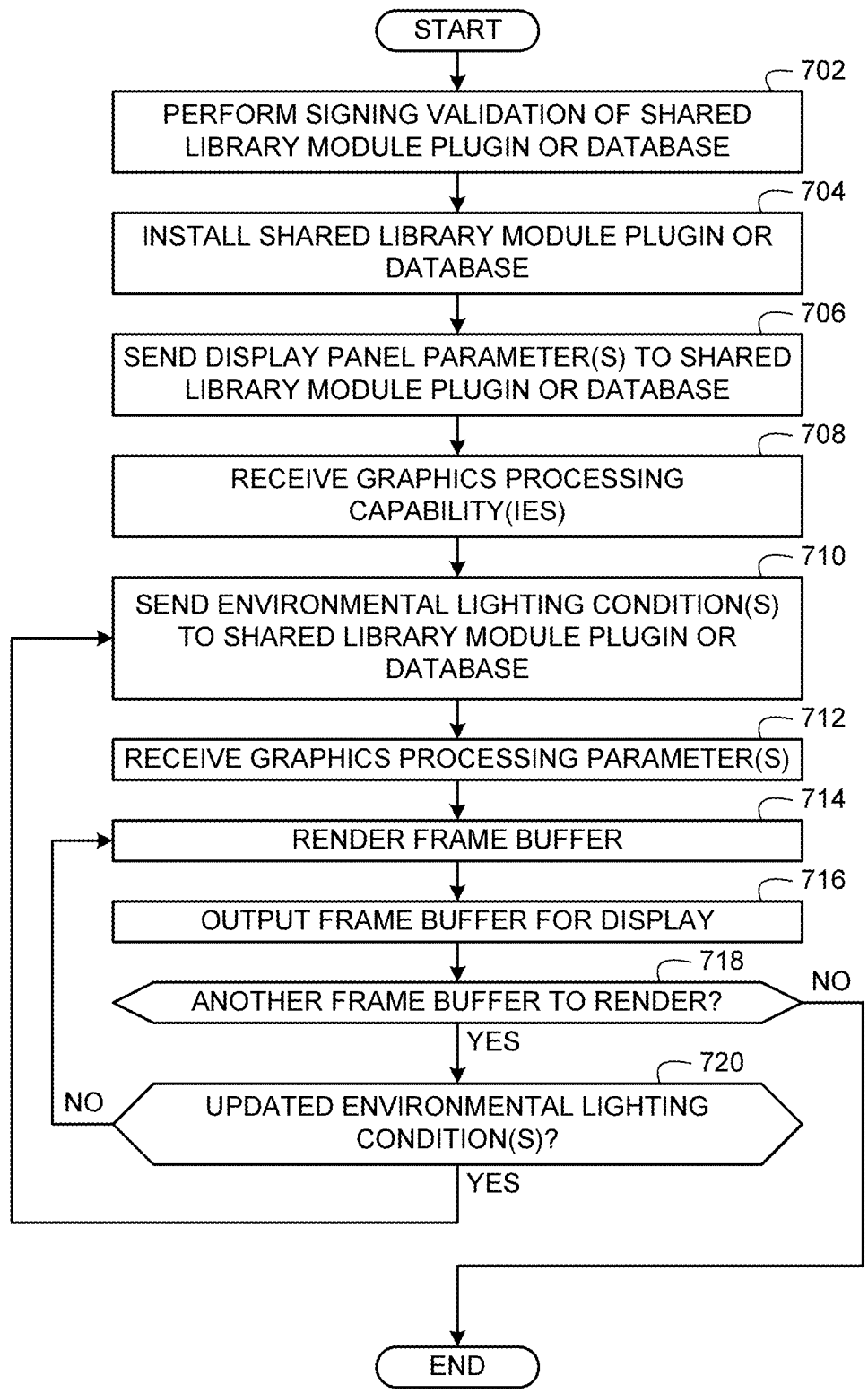
FIG. 7 is a flowchart representative of example machine readable instructions that may be executed to implement the example programmable driver interface (PDI) of FIGS. 1-5 and/or the example computing machine of FIG. 1 to provide extended graphics processing capabilities for use with graphics hardware and a hardware display.

A flowchart representative of example machine readable instructions for implementing the example PDI 102 of FIGS. 1-5 and/or the computing machine 100 of FIG. 1 is shown in FIG. 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example PDI 102 and/or the computing machine 100 may alternatively be used. For example, the order of execution of the blocks may be changed, and/or some of the blocks described may be changed, eliminated, or combined.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 7 may be used to provide extended graphics processing capabilities based on the shared library module plugin 104 of FIGS. 1-3 and 5 and/or based on the extended graphics processing capabilities database 402 of FIGS. 4 and 5. That is, the example program of FIG. 7 may be used in connection with the example shared library module plugin 104 without use of the example database 402. Alternatively, the example program of FIG. 7 may be used in connection with the example database 402 without use of the example shared library module plugin 104. As such, example operations of FIG. 7 are described below in connection with the shared library module plugin 104 and the database 402 even though the example program of FIG. 7 does not require concurrent use of both the example shared library module plugin 104 and the example database 402.

The program of FIG. 7 begins at block 702 at which the example PDI 102 (FIGS. 1-5) performs a signing validation of the shared library module plugin 104 or the extended graphics processing capabilities database 402. For example, the signature validation may be based on a certification process (e.g., based on a digital certificate) provided by the graphics hardware provider 114. The example PDI 102 installs the shared library module plugin 104 or the database 402 (block 704). In the illustrated example, the PDI 102 installs the shared library plugin 104 or the database 402 when the PDI 102 has confirmed a successful signing validation at block 702. For example, at block 704 the PDI 102 may install the shared library module plugin 104 so that the PDI 102 is in communication between the device driver 112 and the shared library module plugin 104. Alternatively, at block 704 the PDI 102 may install the database 402 so that the PDI 102 is in communication between the device driver 112 and the database 402. In the illustrated example, the PDI 102 installs the shared library module plugin 104 and/or the database 402 after the device driver 112 is provided as compiled object code (e.g., one or more compiled object code files) by, for example, the graphics hardware provider 114.

The example PDI 102 sends one or more display panel parameter(s) to the shared library module plugin 104 or the database 402 (block 706). For example, at block 706 the PDI 102 may send the one or more display panel parameter(s) 302 to the shared library module plugin 104 as described above in connection with FIG. 3. Alternatively, at block 706 the PDI 102 may send one or more display panel parameter (s) to the database 402 as part of the graphics processing capabilities request 420 as described above in connection with FIG. 4. The example PDI 102 receives one or more graphics processing capabilities (block 708). For example, at block 708 the example PDI 102 may receive the one or more graphics processing capabilities 304 from the shared library module plugin 104 as described above in connection with FIG. 3 in response to the one or more display parameters that the PDI 102 sent at block 706. Alternatively, at block 708 the example PDI 102 may receive the one or more graphics processing capabilities 406 from the database 402 as described above in connection with FIG. 4 in response to the one or more display parameters that the PDI 102 sent at block 706.

The example PDI 102 sends one or more environmental lighting condition(s) to the shared library module plugin 104 or the database 402 (block 710). For example, at block 710 the PDI 102 may send the environmental lighting conditions information 306 to the shared library module plugin 104 as described above in connection with FIG. 3. Alternatively, at block 710 the PDI 102 may send environmental lighting conditions to the database 402 in the graphics processing parameter request 424 as described above in connection with FIG. 4. The example PDI 102 receives one or more graphics processing parameter(s) (block 712). For example, at block 712 the PDI 102 may receive the one or more graphics processing parameter(s) 308 from the shared library module plugin 104 as described above in connection with FIG. 3 in response to the environmental lighting conditions information sent by the PDI 102 at block 710. Alternatively, at block 712 the example PDI 102 may receive the one or more graphics processing parameter(s) including register values and brightness settings from the mapping table 416 of the database 402 as described above in connection with FIG. 4 in response to the environmental lighting conditions information sent by the PDI 102 at block 710.

The example PDI 102 renders a frame buffer (block 714). For example, the PDI 102 may render the frame buffer based on the one or more graphics processing capabilities received at block 708 and/or based on the one or more graphics processing parameters received at block 712. In some examples, the PDI 102 performs the render operation of block 714 on a copy of a frame buffer maintained by the PDI 102 separate from frame buffers maintained by the device driver 112. In this manner, the PDI 102 may processes and render graphics information using the graphics processing capabilities and/or graphics processing parameters that are provided by the shared library module plugin 104 or the database 402 without needing to access frame buffers maintained by the device driver 112 which does not have the graphics processing capabilities provided by the shared library module plugin 104 or the database 402.

At block 716, the example PDI 102 outputs the frame buffer for displaying. For example, the PDI 102 may output the frame buffer to the hardware display 108 via the graphics hardware 106 of FIG. 1 to display the frame buffer via the hardware display 108. The example PDI 102 determines whether there is another frame buffer to render (block 718). When there is another frame buffer to render (block 718), the example PDI 102 determines whether there are updated environmental lighting conditions (block 720). In the illustrated example, the PDI 102 receives a sensor event notification from the sensor monitor 208 of FIGS. 2, 4, and 5 when a change in environmental lighting is detected (e.g., by a light sensor). As such, when the example PDI 102 receives a sensor event notification from the sensor monitor 208, then the PDI 102 determines at block 720 that there are one or more updated environmental lighting condition(s). When there are updated environmental lighting conditions, control returns to block 710 so that the example PDI 102 can send the updated environmental lighting conditions to the shared library module plugin 104 or the database 402 to receive one or more updated graphics processing parameter(s) at block 712 corresponding to the updated environmental lighting conditions. Thus, frame buffers rendered by the PDI 102 at block 714 may be rendered using different graphics processing parameters corresponding to different environmental lighting conditions based on when environmental lighting conditions change. For example, a previous frame buffer rendered at block 714 may be rendered based on first graphics processing parameters corresponding to first environmental lighting conditions, and a subsequent frame buffer rendered at block 714 may be rendered based on second graphics processing parameters corresponding to second environmental lighting conditions different from the first environmental lighting conditions. For instances in which updated environmental lighting conditions are not detected at block 720, control returns to block 714, at which the PDI 102 renders a next frame buffer based on the same graphics processing parameter(s) that the PDI 102 used to render the previous frame buffer. When the PDI 102 determines at block 718 that there is not another frame buffer to render, the example process of FIG. 7 ends.

Figure 8:
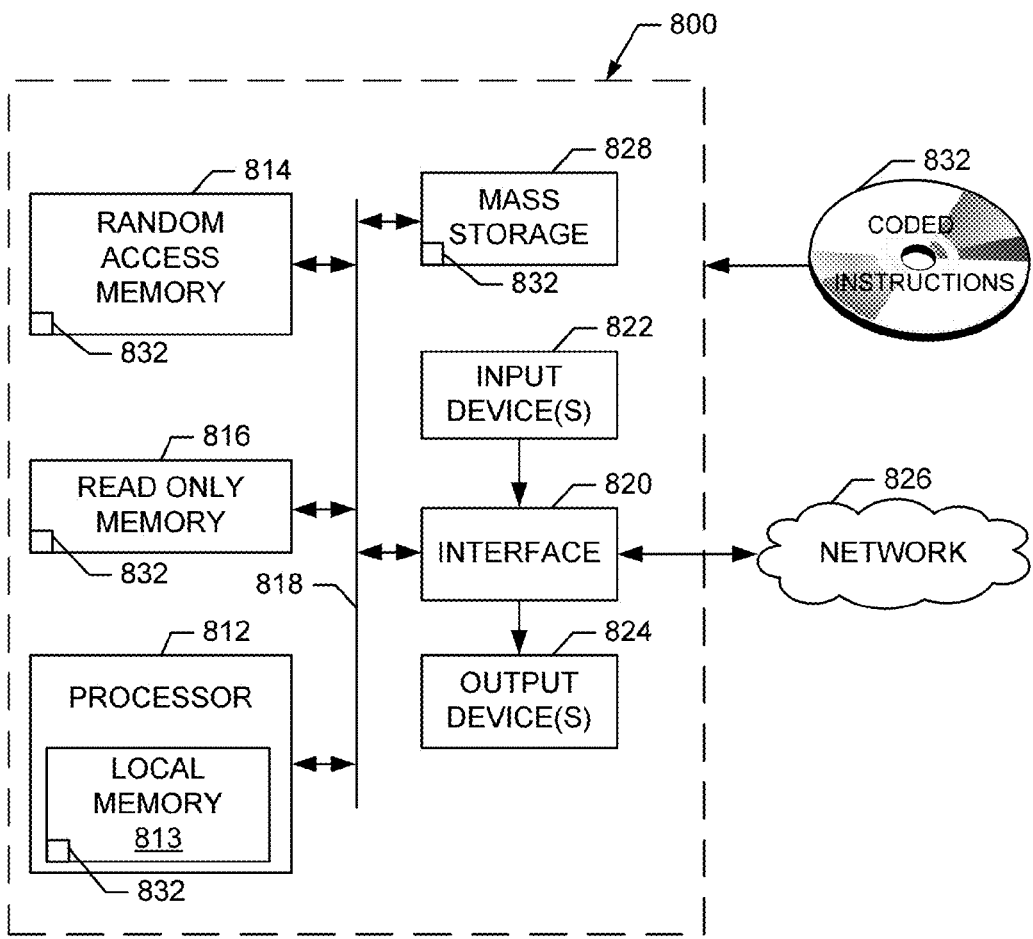
FIG. 8 is a block diagram of an example processor system that may execute the instructions of FIG. 7 to implement the example programmable driver interface (PDI) of FIGS. 1-5 and/or the example computing machine of FIG. 1.

FIG. 8 is a block diagram of an example processor system 800 that may execute the instructions of FIG. 7 to implement the example PDI 102 of FIGS. 1-5 and/or the example computing machine 100 of FIG. 1. The processor platform 800 of the illustrated example can be, for example, a server, a personal computer, a mobile device (e.g., a cell phone, a smart phone, a tablet such as an iPad® tablet), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 which may be used to implement the machine readable instructions of FIG. 7 may be stored in the mass storage device 828, in the volatile memory 814, in the non-volatile memory 816, and/or on a removable tangible computer readable storage medium such as a CD or DVD.

From the foregoing, it will be appreciated that methods, apparatus and articles of manufacture have been disclosed to enable third parties to provide extended graphics processing capabilities for use with graphics hardware of computing machines without needing to rebuild new device drivers provided by manufacturers of the graphics hardware. In this manner, examples disclosed herein are useful for equipment manufacturers, such as PC manufacturers or manufacturers of other electronic devices, to customize the graphics capabilities of machines without needing the manufacturer or provider of the graphics hardware to agree to incorporate such custom capabilities into the device driver for the graphics hardware. In addition, examples disclosed herein enable equipment manufacturers or third parties to protect their intellectual property in custom graphics processing capabilities by maintaining control of such custom graphics processing capabilities when determining which machines are to be equipped with such custom features. That is, by not needing to provide the custom graphics processing capabilities to the hardware manufacturer or provider of the graphics hardware for incorporating into a device driver (e.g., the device driver 112 of FIG. 1), the custom graphics processing capabilities are less likely to be freely distributed to any machine or end user without proper credit, recognition, and/or compensation to the owner of the custom graphic processing capabilities. As such, examples disclosed herein may be used by some equipment manufacturers or third parties to differentiate themselves from other equipment manufacturers or third parties based on their custom graphic processing capabilities.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   sending a display panel parameter to a shared library module, the display panel parameter sent by a programmable driver interface in communication with the shared library module and a graphics hardware device driver, the shared library module including first graphics instructions to implement a first graphics processing capability, and the graphics hardware device driver including a second graphics processing capability different from the first graphics processing capability, the graphics hardware device driver to operate between an operating system and graphics hardware, the graphics hardware in communication with a display;
   executing the first graphics instructions with a logic circuit to perform a render operation via the programmable driver interface on a frame buffer in accordance with the first graphics processing capability, the first graphics instructions received at the programmable driver interface from the shared library module in response to the sending of the display panel parameter, and when the graphics hardware device driver is compiled object code, the first graphics instructions obtained from the shared library module to implement the first graphics processing capability via the programmable driver interface without recompiling the graphics hardware device driver; and outputting the frame buffer to the display.

2. A method as defined in claim 1, further including installing the shared library module after the shared library module successfully completes a signing validation based on a certification process from a provider of graphics hardware corresponding to the graphics hardware device driver.

3. A method as defined in claim 1, wherein the shared library module is provided by a third party separate from a provider of the graphics hardware device driver and corresponding graphics hardware.

4. A method as defined in claim 1, further including installing the shared library module after the graphics hardware device driver is provided as a compiled object code file.

5. A method as defined in claim 1, wherein the executing of the first graphics instructions to perform the render operation on the frame buffer includes performing the render operation on a first copy of the frame buffer maintained by the programmable driver interface separate from a second copy of the frame buffer maintained by the graphics hardware device driver.

6. A method as defined in claim 1, wherein the executing of the first graphics instructions to perform the render operation via the programmable driver interface on the frame buffer includes performing the render operation based on at least one first graphics processing parameter corresponding to first environmental lighting condition information, and further including performing a second render operation via the programmable driver interface on a second frame buffer based on at least one second graphics processing parameter corresponding to second environmental lighting condition information obtained based on a notification from a sensor monitor.

7. An apparatus, comprising:
an extended graphics processing capabilities database to receive a display panel parameter;
a programmable driver interface in communication with the extended graphics processing capabilities database and with a graphics hardware device driver, the extended graphics processing capabilities database including first graphics instructions to execute a first graphics processing capability, the graphics hardware device driver including a second graphics processing capability, the programmable driver interface to perform a render operation on a frame buffer by executing the first graphics instructions received at the programmable driver interface from the extended graphics processing capabilities database in response to receipt of the display panel parameter, and when the graphics hardware device driver is compiled object code, the first graphics instructions to be obtained from the extended graphics processing capabilities database to implement the first graphics processing capability via the programmable driver interface without recompiling the graphics hardware device driver; and graphics hardware including a graphics processing unit to output the frame buffer to a display, the graphics hardware device driver to operate between an operating system and the graphics hardware.

8. An apparatus as defined in claim 7, wherein the programmable driver interface is further to install the extended graphics processing capabilities database after the extended graphics processing capabilities database successfully completes a signing validation based on a certification process from a provider of graphics hardware corresponding to the graphics hardware device driver.

9. An apparatus as defined in claim 7, wherein the extended graphics processing capabilities database is provided by a third party separate from a provider of the graphics hardware device driver and corresponding graphics hardware.

10. An apparatus as defined in claim 7, wherein the programmable driver interface is further to install the extended graphics processing capabilities database after the graphics hardware device driver is provided as a compiled object code file.

11. An apparatus as defined in claim 7, wherein the programmable driver interface is to perform the render operation on the frame buffer by performing the render operation on a first copy of the frame buffer maintained by the programmable driver interface separate from a second copy of the frame buffer maintained by the graphics hardware device driver.

12. An apparatus as defined in claim 7, wherein the programmable driver interface is to perform the render operation on the frame buffer based on at least one first graphics processing parameter corresponding to first environmental lighting condition information, and the programmable driver interface is further to perform a second render operation on a second frame buffer based on at least one second graphics processing parameter corresponding to second environmental lighting condition information obtained based on a notification from a sensor monitor.

13. At least one tangible computer readable storage medium comprising instructions that, when executed, cause at least one machine implementing a programmable driver interface to at least:
send a display panel parameter to a shared library module, the programmable driver interface in communication with the shared library module and a graphics hardware device driver, the shared library module including first graphics instructions to implement a first graphics processing capability, and the graphics hardware device driver including a second graphics processing capability different from the first graphics processing capability, the graphics hardware device driver to operate between an operating system and graphics hardware, the graphics hardware in communication with a display;
execute the first graphics instructions to perform a render operation on a frame buffer in accordance with the first graphics processing capability, the first graphics instructions received at the programmable driver interface from the shared library module in response to the sending of the display panel parameter, and when the graphics hardware device driver is compiled object code, the first graphics instructions obtained from the shared library module to implement the first graphics processing capability via the programmable driver interface without recompiling the graphics hardware device driver; and
output the frame buffer to the display.

14. At least one tangible computer readable storage medium as defined in claim 13, wherein the instructions further cause the at least one machine to install the shared library module after the shared library module successfully completes a signing validation based on a certification process from a provider of graphics hardware corresponding to the graphics hardware device driver.

15. At least one tangible computer readable storage medium as defined in claim 13, wherein the shared library module is provided by a third party separate from a provider of the graphics hardware device driver and corresponding graphics hardware.

16. At least one tangible computer readable storage medium as defined in claim 13, wherein the instructions further cause the at least one machine to install the shared library module after the graphics hardware device driver is provided as a compiled object code file.

17. At least one tangible computer readable storage medium as defined in claim 13, wherein the instructions further cause the at least one machine to execute the first graphics instructions to perform the render operation on the frame buffer by performing the render operation on a first copy of the frame buffer maintained by the programmable driver interface separate from a second copy of the frame buffer maintained by the graphics hardware device driver.

18. At least one tangible computer readable storage medium as defined in claim 13, wherein the instructions further cause the at least one machine to execute the first graphics instructions to perform the render operation on the frame buffer by performing the render operation based on at least one first graphics processing parameter corresponding to first environmental lighting condition information, and the instructions further cause the at least one machine to perform a second render operation on a second frame buffer based on at least one second graphics processing parameter corresponding to second environmental lighting condition information obtained based on a notification from a sensor monitor.

19. An apparatus, comprising:
graphics hardware to present information on a hardware display;
a device driver to translate information from at least one of an operating system or an application to a format corresponding to the graphics hardware, the device driver having a first graphics processing capability to process the information for presenting on the hardware display; and
a programmable driver interface in communication with the device driver, the first graphics processing capability to be in a compiled object code file of the device driver when the third party is enabled to add the second graphics processing capability via the programmable driver interface, the programmable driver interface to enable a third party to add a second graphics processing capability for use with the graphics hardware without recompiling the device driver by adding the second graphics processing capability in at least one of a shared library module plugin or a database to be in communication with the programmable driver interface without recompiling a source code file corresponding to the compiled object code file.

20. An apparatus as defined in claim 19, wherein the second graphics processing capability is accessible by the operating system and a plurality of applications in a same runtime environment.

21. An apparatus as defined in claim 19, wherein the device driver and the programmable driver interface enable the operating system and an application to send the information to the graphics hardware without needing specific hardware configurations and/or communication configurations of the graphics hardware.

22. An apparatus as defined in claim 19, wherein the graphics hardware includes a graphics processing unit.

* * * * *